Oct. 28, 1958 — M. W. DICKOVER — 2,858,354
COMBUSTION-PROOF BATTERY VENT
Filed June 10, 1955
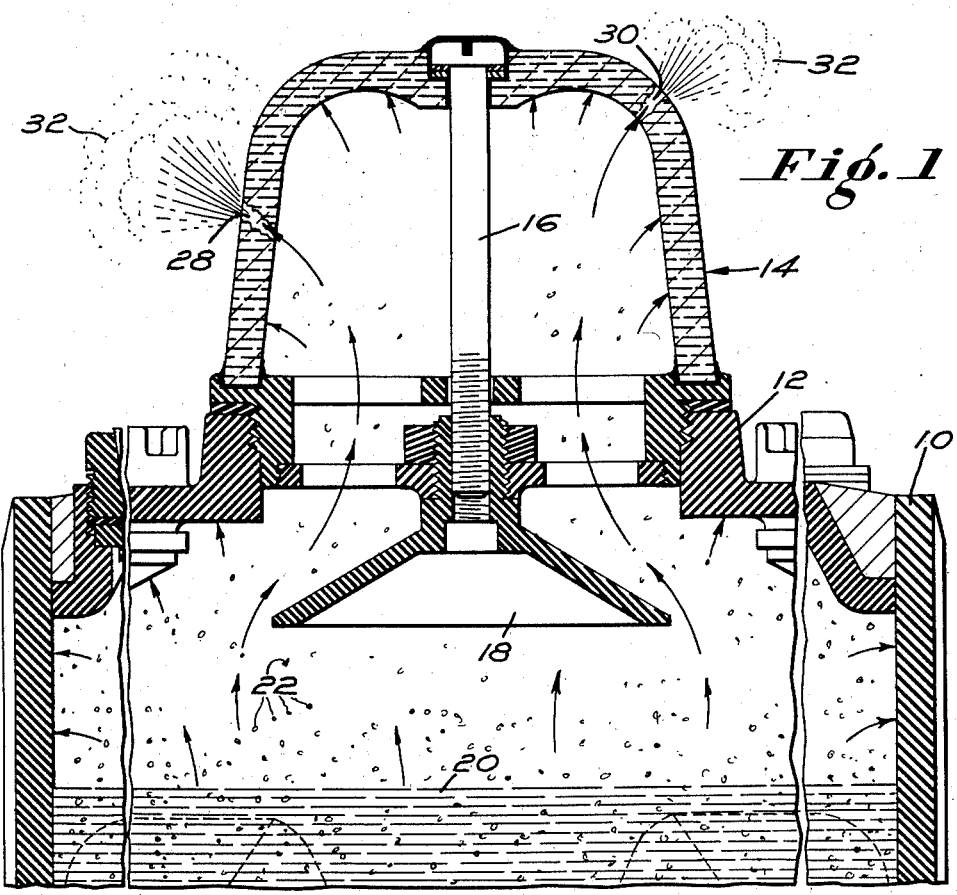
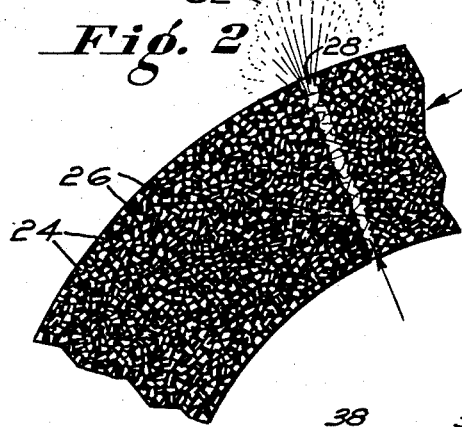
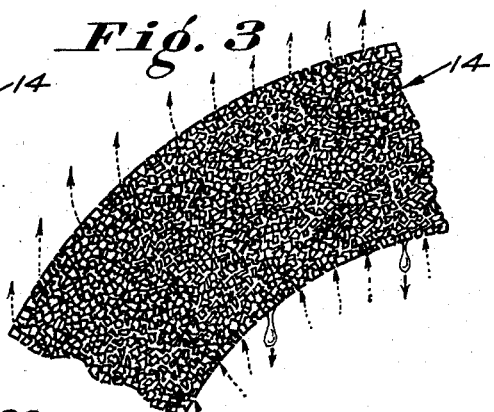
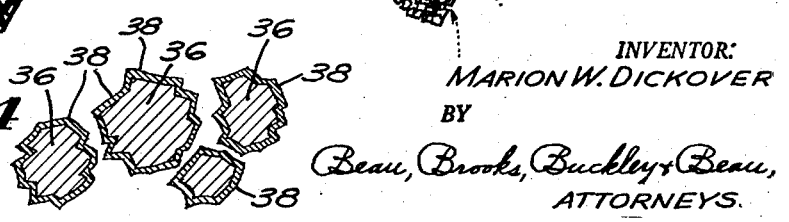
INVENTOR:
MARION W. DICKOVER
BY
Beau, Brooks, Buckley & Beau,
ATTORNEYS.

United States Patent Office 2,858,354
Patented Oct. 28, 1958

2,858,354

COMBUSTION-PROOF BATTERY VENT

Marion W. Dickover, Williamsville, N. Y., assignor to Gould-National Batteries, Inc., St. Paul, Minn.

Application June 10, 1955, Serial No. 514,566

3 Claims. (Cl. 136—179)

This invention relates to storage batteries, and more particularly to improvements in means for venting potentially combustible or explosive gases from storage batteries, such as are generated during the battery charging or discharging operations.

Certain type storage batteries generate hydrogen and oxygen gases requiring to be vented to the outside atmosphere, and considerable trouble has been encountered in connection with battery explosions and/or fires, particularly when such batteries are operated in relatively confined spaces. Attempts have been previously made to devise "explosion-proof" vents for such storage batteries, and to some extent these prior efforts have succeeded in reducing the explosion hazard problem. For example, U. S. Patents 2,471,585 and 2,491,370 disclose porous cylinder or "dome" type gas vents designed to cause the generated gases to exude in dispersed manner through the pores of the vent dome; with a view to reducing the possibility of dangerous concentrations of such gases in regions where ignition of the gas accumulation is a possibility.

However, it has been found in practice that such devices of the prior art are subject to certain operative conditions such as sometimes operate to prevent the porous dome structures from functioning in the intended manner. For example, experience shows that the gas generating processes within the battery invariably tend to cause battery acid liquid to become entrained within the gases emanating therefrom, whereby the acid vapors and liquid particles thereof are carried into the porous structures of the vent devices to deposit there in the form of liquid globules and/or films tending to plug the interstices of the material from which the porous vent device is manufactured. Subsequent further development of gases within the battery electrolyte thereupon causes the gas pressure interiorly of the battery cell to increase above normal and to an undesirable degree, and such increase of internal gas pressure is often subsequently accompanied by a "blow-out" of acid liquid at one or several isolated points in the vent dome. Thus, gas escape jetways are opened up through the previously "plugged" dome, through which concentrations of battery gases rush in the form of concentrated gas jets. Hence, in event a spark or flame or the like comes into contact with the gas so emanating from the unplugged portion of the vent dome, an explosion-hazardous condition exists in spite of the fact that the use of such a porous vent dome will theoretically preclude existence of such hazard.

The present invention contemplates means for conditioning a porous gas vent dome structure or the like, as previously used in storage batteries; whereby to preclude the possibility of acid plugging of the pores of the dome, so as to in turn preclude the possibility of subsequent channeling or blow-outs through the dome wall such as would establish an escape gas jet stream condition of explosion-hazardous form. The purpose of the invention is accomplished by treating the foraminous wall structure of the dome member of the storage battery with a surface tension modifying substance such as will render said wall structure substantially non-wetting; to the end that the vapor-entrained liquids will not adhere to the walls of the porous dome structure, whereby the pores of the dome structure will not become plugged with liquid acid as explained hereinabove. Hence, the dome will be maintained in proper porous wall condition so as to be adapted to continue to function efficiently as a uniform low pressure gas dispersion device thereby preventing dangerous gas accumulations in the region of issuance of the gas from the battery structure.

The purpose and operation of the invention is illustrated in the accompanying drawings wherein:

Fig. 1 is a fragmentary sectional view through a previously standard form of battery gas vent device comprising a dome-like structure of porous ceramic material intended to render the battery operation explosion-proof. Furthermore, Fig. 1 illustrates malfunctioning of the porous dome structure subsequent to "plugging" thereof with battery acid vapor entrained liquids;

Fig. 2 is a fragmentary sectional view, on an enlarged scale, through a portion of the wall structure of the dome element of Fig. 1, further illustrating the process by which such a dome structure becomes plugged with liquid, thereby producing an explosion-hazardous condition;

Fig. 3 is a view corresponding to Fig. 2, but illustrating the condition of the porous dome structure subsequent to treatment in accord with the present invention, whereby explosion-hazardous conditions are prevented; and Fig. 4 is a fragmentary sectional view, on a greatly enlarged scale, of a portion of the ceramic nodule porous dome structure when treated in accord with the present invention so as to be repellent to battery acid depositions thereon.

As illustrated in Fig. 1 of the drawing, the invention may be applied to a storage battery comprising a casing portion 10; a top cover 12; and an "explosion-proof" vent device of porous ceramic dome form as illustrated generally at 14. It will of course be appreciated that the precise design of the dome or vent device 14 may be of a variety of forms in lieu of the specific design illustrated herein. However, in the case of the present invention the dome 14 is illustrated as being held in mounted position by means of a bolt 16, and is subtended by means of a conical baffle 18 such as is intended to reduce the "splash" of battery acid (designated 20) upwardly into the interior of the dome 14.

As illustrated at 22, the escape of gases from the battery electrolyte in variably causes acid vapors and gas bubbles and/or globules to rise into the interior of the dome 14, wherein in time liquid accumulations tend to fill the porous structure of the dome so as to plug the latter with liquid. Hence, whereas the porous nodular structure of the dome element as formed by the nodules designated 24( Fig. 2) is initially of open porosity form, the dome structure in time becomes filled with battery acid liquid as indicated at 26, and this plugging of the porous structure results in development of a substantial back pressure against the acid gases generating within the battery cell. Hence, as illustrated at 28—30 (Figs. 1, 2) the subsequent build-up of pressure interiorly of the battery cell will result in a periodical "blow-out" of the liquid plugging of the dome pores, whereby a relatively open channel through the dome wall structure will be provided and through which a jet of battery gases will issue at high velocity, as indicated at 32. Thus, combustible battery gases will issue from the dome structure in concentrations so as to constitute very real explosion hazards.

To prevent the difficulties referred to hereinabove, the present invention contemplates treating of the porous ceramic wall structure of the dome member 14 with a non-wetting agent. Any suitable liquid-repellent may be employed such as for example a silicone compound known commercially as XE–23, manufactured by the Linde Air Products Co., to provide very satisfactory results for the purpose of the present invention. Or, in lieu thereof it is contemplated that any other suitable liquid repellent may be used, such as for example a wax-base solution or a petroleum derivative such as kerosene, oil, or the like; or some other synthetic or natural non-wetting agent. The treatment comprises simply saturating the member 14, as by dipping, spraying, brushing or the like, with the selected non-wetting agent liquid, and then permitting any excess to drain off. Thus, as illustrated in Fig. 4, the ceramic granules or nodules interiorly of the structure of the dome member 14 and designated 36, are coated as indicated at 38 by means of a liquid repellent substance, whereby the liquid particles coming in contact with the porous interior structure of the dome member will have no tendency to adhere thereto. Thus, the open pore structure of the dome member is kept wide open throughout the entire extent thereof; whereby the battery gases continue to find escape through the dome wall structure in finely dispersed condition, as in accord with the purpose and intention of the original porous dome structure. Accordingly, while the porous dome structure is so treated in accord with the present invention the explosion or fire hazard conditions referred to hereinabove are avoided, and the danger attendant use of earlier battery constructions is thereby eliminated.

I claim:

1. In combination, a storage battery casing containing acid liquid electrolyte and having a wall portion with a gas vent aperture therethrough, an inverted cup-shaped ceramic cover enclosing said aperture, said cover being of porous wall form whereby to provide therethrough uniformly dispersed minutely dimensioned gas-liquid escape passageways of normally continuously open form, and a non-wetting material coating substantially covering the wall portions only of said passageways while leaving the latter open thereby precluding substantial accumulations within said passageways of electrolyte liquid such as would otherwise tend to occur due to deposition of electrolyte liquid entrained in the venting gas.

2. In combination, a storage battery casing containing acid liquid electrolyte and having a wall portion with a gas vent aperture therethrough, an inverted cup-shaped cover enclosing said aperture, said cover being of porous wall form whereby to provide therethrough uniformly dispersed minutely dimensioned gas escape passageways of normally continuously open form, and a non-wetting material coating substantially covering the wall portions only of said passageways while leaving the latter open thereby precluding accumulations of liquid within said passageways such as would otherwise tend to plug the pores of said cover.

3. In combination, a storage battery casing containing a liquid electrolyte and having a top wall portion with a gas vent opening therethrough, a cup-shaped cover enclosing said opening, said cover being of porous wall form whereby to provide therethrough uniformly dispersed minutely dimensioned gas escape passageways, and a non-wetting material coating on the wall portions only of said passageways while leaving the latter open for gas-liquid escape purposes thereby precluding accumulations within said passageways of electrolyte liquid such as would otherwise tend to close said passageways.

References Cited in the file of this patent

UNITED STATES PATENTS

| | | |
|---|---|---|
| 1,739,388 | Dexter | Dec. 10, 1929 |
| 2,000,815 | Berl | May 7, 1935 |
| 2,394,333 | Schneider | Feb. 5, 1946 |
| 2,436,465 | Wilson | Feb. 24, 1948 |
| 2,471,585 | Rittenhouse et al. | May 31, 1949 |